H. HESS.
BALL BEARING.
APPLICATION FILED JUNE 15, 1905. RENEWED JAN. 14, 1910.
967,124.
Patented Aug. 9, 1910.
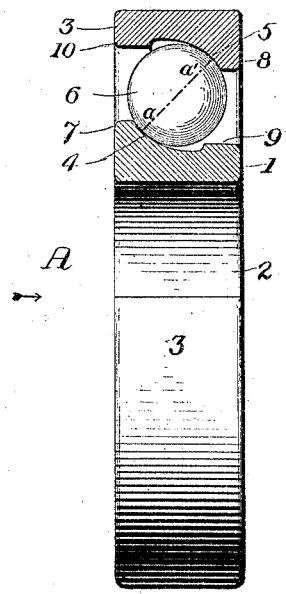
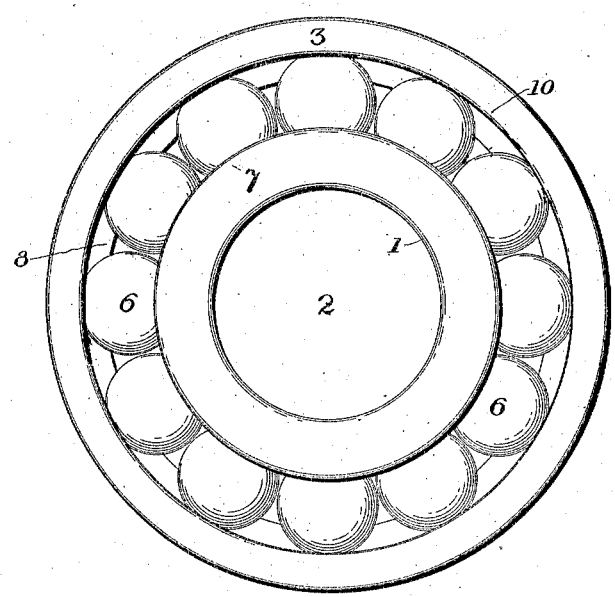

UNITED STATES PATENT OFFICE.

HENRY HESS, OF PHILADELPHIA, PENNSYLVANIA.

BALL-BEARING.

967,124. Specification of Letters Patent. Patented Aug. 9, 1910.

Application filed June 15, 1905, Serial No. 265,382. Renewed January 14, 1910. Serial No. 538,102.

*To all whom it may concern:*

Be it known that I, HENRY HESS, a citizen of the United States, and a resident of Philadelphia, in the county of Philadelphia and State of Pennsylvania, have invented a new and useful Ball-Bearing, of which the following is a specification.

My invention relates to ball bearings.

An object of my invention is to provide a ball bearing in which a single pair of ball races is so constructed and arranged as to properly and efficiently bear a load composed of two loads tending in different directions; for instance, composed of a radial load and an end thrust.

A further object is to so construct a bearing having the characteristics above mentioned, that it is assembled and may be handled, shipped and emplaced in working position, as a unit.

The advantages of my invention will be further pointed out in connection with the accompanying drawings which illustrate exemplifying structures in which my invention is embodied.

Figure 1 is a side view of a bearing embodying my invention, the upper half being in longitudinal section, and Fig. 2 is an end view of the bearing of Fig. 1.

Reference numeral 1 designates an inner bearing ring; 2, a bore in said ring, adapted to be entered by a shaft, to which it may be secured in any approved manner; 3, an outer bearing ring; 4, a ball race in ring 1; 5, a ball race in ring 3, confronting ball race 4; 6, balls, annularly disposed about the bearing axis, intermediate ball races 4 and 5; 7, a flange on ring 1; 8, a similar flange on ring 3; 9, a lip on ring 1; 10, a similar lip on ring 3; and *a—a'* designates the direction of the load.

This bearing is intended to carry a composite load, that is, one tending in two or more different directions. As an example of such a load, in this instance there is supposed to be a radial load, and an end thrust tending to move the inner ring 1 to the right with reference to the outer ring 3, said end thrust having a force as great as the radial load. Under these conditions the resultant load is exerted in the direction of the line *a—a'*, or at an angle of 45° to the axis of the bearing. To properly carry this load the races are arranged so that their treads contact with the balls at the terminations of lines *a—a'*. In the present instance the proper contact points are shown at *a* and *a'*.

The disposition of the races in ball bearings is most conveniently indicated by means of a tangent intersecting the race at the point of ball contact, the tangent being drawn to the circumference of the ball. When the tangent of a ball race is referred to in the claim herein, it is intended to indicate a line passing through the race at the point of ball contact and tangent to the circumference of the ball at that point.

The bearing is assembled in any approved manner. The bearing is retained in assembly by the flanges 7, 8, and the lips 9, 10. These lips permit a slight relative movement of the bearing rings, but limit such movement by contact with the balls, preventing accidental disassembly of the bearing.

The bearing thus forms a complete and independent unit, may be handled and shipped as such, and may be placed in working position simply by securing the inner and outer rings to the desired moving or stationary members (as the case may be). The bearing is adapted to use in such an application as line shafting, where the shaft, to which is secured the inner ring 1, is revoluble, or to vehicle wheels, where the axle, to which, in this instance, the inner ring is secured, is stationary, and the hub, to which the outer ring is fixed, is the moving member. But the bearing is adapted to a great variety of uses, and those mentioned are but two examples of the same.

What I claim is:

A ball bearing assembled as a complete operative unit and comprising, in combination, (*a*) an inner bearing ring formed of a single piece of metal and having a ball race whose tread is so positioned that its tangent is non-parallel to the axis of the ring, and also having a lip formed in it at the side opposite to the ball race, the shape of the race being such that a clearance is left between its tread and the said lip, so that the balls contact with the race only at the tread; (*b*) an outer bearing ring formed of a single piece of metal and having a ball race and lip similar to those of the inner ring but respectively placed relatively-opposite the same; and (c) a series of balls running in the races; the bearing being retained in assembly by engagement of the lips with the balls and the shape and disposition of the races enabling the bearing to properly carry a load composed of a radial and a thrust effort.

In testimony whereof I have affixed my signature in the presence of two witnesses.

HENRY HESS.

Witnesses:
 THEO. H. McCALLA,
 NETTIE L. HAHN.